Oct. 28, 1958     A. ORTLIEB     2,858,181

METHOD OF AND ARRANGEMENT FOR MAKING MICRO RECORDINGS

Filed Oct. 26, 1953     2 Sheets-Sheet 1

Inventor

ALFRED ORTLIEB
BY:

Oct. 28, 1958 A. ORTLIEB 2,858,181
METHOD OF AND ARRANGEMENT FOR MAKING MICRO RECORDINGS
Filed Oct. 26, 1953 2 Sheets-Sheet 2

INVENTOR
ALFRED ORTLIEB
BY:

United States Patent Office 2,858,181
Patented Oct. 28, 1958

2,858,181

METHOD OF AND ARRANGEMENT FOR MAKING MICRO RECORDINGS

Alfred Ortlieb, Stuttgart-Vaihingen, Germany, assignor to Robert Bosch G. m. b. H., Stuttgart, Germany Application October 26, 1953, Serial No. 388,288

Claims priority, application Germany October 28, 1952

9 Claims. (Cl. 346—74)

The present invention relates to a method of and arrangement for making micro recordings, and in particular to a process and arrangement in which a trace is burned on a metal coated record carrier element with the aid of a stylus arranged on the record carrier element.

The ratio between the thickness of the trace produced by the stylus to the width and the feed rate of the record carrier determines for all recorders the accuracy of the reading, or interpretation, of the recorded trace. The smaller the trace thickness of the recording, the smaller need be the movement of the indicator arm, of a measuring instrument, to which the stylus is attached, and the smaller need be the width of the record carrier element as well as its feed rate. For thick or heavy traces, on the other hand, such as produced by ink type recording apparatus, large movements of the indicator arm are required as well as a large width and feed rate of the record carrier element if it is desired to obtain accurate readings.

Research has shown that electrical recording processes lend themselves admirably for making micro recordings. Most electrical recording processes involve the burning of a trace on a metal coating of a metallized record carrier by means of a stylus arranged on the metal coated record carrier.

In accordance with the invention an electrical recording process is used which requires extremely small movement of the indicator arm and which yields wholly satisfactory readable recordings by the use of an electrical stylus having a width of 0.01 to 0.08 millimeter (mm.) between which and the metallized record carrier is connected a voltage of approximately 2 to 14 volts. A recording speed, ranging between 0.0 and 3.0 meters per second, is used in the electrical recording process in accordance with the invention. Furthermore the record carrier is made of a smooth insulated carrier strip which is provided with a metal coating on at least one side thereof, the metal coating itself being covered with a thin coating of a liquid of relatively low volatility. The liquid is preferably of a type which will not corrode the metal coating. As a result of using the recording process in accordance with the invention the trace thickness of the recorder will be effectively limited.

The liquid coated on the metal coating of the insulating material, through its cooling effect at burning points, insure that the recorded trace will not be wider than the width of the tip of the electrical stylus. Moreover, the liquid coating prevents accumulation of residue, from the burned metal layer, at the tip of the electrical stylus. The smooth surface of the record carrier prevents the electrical stylus from being mechanically overloaded thereby lessening the risk of breakage of the stylus and thus effectively preventing the interruption of the recording process.

It is an object of the present invention to provide an efficient method of making micro recordings.

It is yet another object of the present invention to provide a method of making micro recordings which may be enlarged through the use of optical magnifying systems.

It is yet another object of the present invention to provide a method of making micro recordings which can be made with small compact and simple apparatus.

Still another object of the present invention is to provide an arrangement for conveniently carrying out the method of making micro recordings.

With the above objects in view the present invention mainly consists of a process for making micro recordings comprising the steps of coating a liquid of relatively low volatility on the metal coating of a metallized record carrier, moving the record carrier and stylus with respect to each other at a rate of approximately 0.3 meter, and simultaneously connecting a voltage of approximately 12 volts between the metal coating of the metallized record carrier and a stylus of approximately 0.08 mm. thickness for burning a trace in the metal coating of the metallized record carrier.

With the above objects in view the present invention also mainly consists of apparatus for carrying out the method for making micro recordings comprising a sheet of partially transparent insulating material having scale markings thereon, a metal coating on one side of the sheet of partially transparent insulating material, a layer of liquid of relatively low volatility on the metal coating, a stylus of approximately 0.08 mm. thickness arranged on the metal coating, moving means for moving the sheet of partially transparent insulating material and the stylus with respect to each other at a rate of approximately 0.3 meter per second, and a voltage source of approximately 12 volts connected between the metal coating and the stylus for burning a trace in the metal coating over the partially transparent portion of the sheet of insulating material thereby permitting light to pass through the burned trace in the metal coating.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
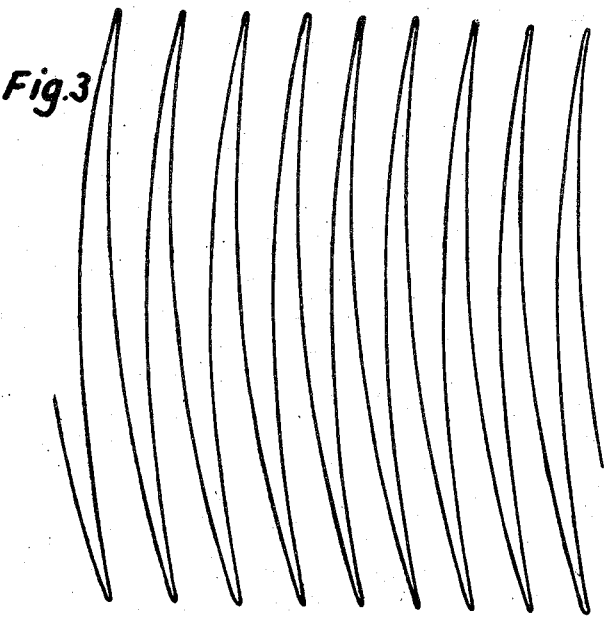
Figure 4:
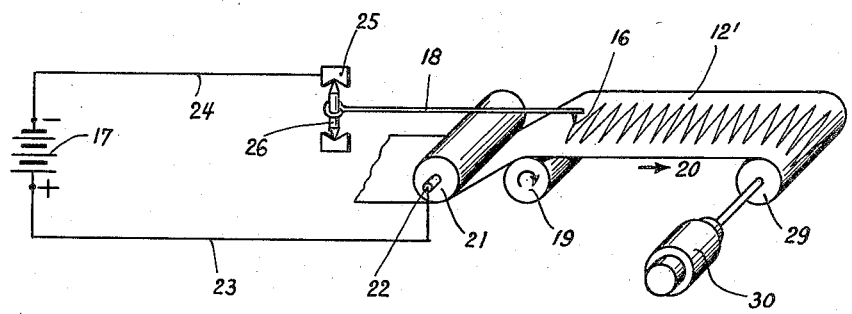
Figure 5:
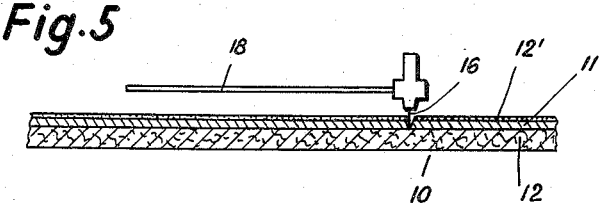

Fig. 3 grows graphically for comparison, a recording of usual size;

Fig. 4 is a perspective view of a recording mechanism according to the invention together with a wiring diagram of the electrical circuit connected thereto; and Fig. 5 is a side elevation, partly in section on an enlarged scale of Fig. 4.

Referring to the drawings and first to Figs. 4 and 5, a record carrier element 10 consists of a dielectric, or insulating, strip 12, shown on an enlarged scale in Figs. 4 and 5, and a metal coating 11 on the insulating strip 12. The insulating strip 12 may be metallized by depositing the metal from the vapor state or by cathodic evaporation on the dielectric strip. A coating of a liquid having a relatively low volatility is formed on the metal surface by first evaporating the liquid and then condensing the vapors on the surface of the metal coating so as to form a thin liquid coating on the metal coating. Any liquid having a low volatility may be used in the process in accordance with the invention, the following having been found to give particularly good results, oils of all type including mineral oils such as castor oil, and hydrocarbon oils such as paraffin oils, tricresylphosphate, fats such as petroleum, jelly and the like, etc. By liquids of low volatility is meant to indicate that the liquid is difficultly vaporizable and special means are necessary to evaporate the liquid so that after the metal layer is coated with the liquid the same will not evaporate under ordinary conditions.

The liquid coat may also be applied to the metal coating by brushing, spraying or dipping processes. Another important factor in the selection of a liquid is the consideration of the possibility of corroding the metal coated layer, which of course is highly undesirable. Each of the liquids set forth above will not corrode the metal coated layer.

The layer of liquid 12' having a low volatility, such as oil, on the metal coating 11 serves a twofold purpose. In the first place the liquid coating 12' on the metal coating 11 permits through its cooling action at burning points the making of a trace which is not wider than the tip of the electrical stylus making the trace. In the second place, the liquid layer prevents accumulation of residue from the burned metal layer at the tip of the electrode.

From Fig. 4 it will be seen that the insulating strip 12 is flexible and is moved over a roller 19 in the longitudinal direction of the insulating strip 12 by suitable driving means 29, 30 so that the recording element 10 moves in the direction of the arrow 20. Another roller 21 is arranged parallel to and at a short distance from the roller 19, the recording element 10 forming an S-shaped curve and being touched by the rollers 19 and 21 respectively, on the side of the insulating strip 12 and the side of the metal coating 11. The roller 19 consists preferably of dielectric material whereas the roller 21 consists of electro-conductive material for instance carbon, and is in conductive connection with the metal coating 11. The axle 22 of the roller 21 is connected by a wire 23 to the positive terminal of a current source 17 the negative terminal of which is connected by a wire 24 to the bearing 25 of an axle 26 forming part of a measuring instrument (not shown). The current source 17 is preferably a battery supplying a voltage of between 12 to 14 volts. The bearing 25 and the axle 26 are made of electrically conductive material. The axle 26 carries a pointer 18 also made of electrically conductive material and carrying at its end a metal needle 16 arranged with the point thereof in sliding contact with the metal coating 11. The operation of the device so far described is as follows:

When the roller 19 moves in the direction of the curved arrow 27, the insulating strip 12 of the record carrier element 10 with the metal coating 11 moves in the direction of the arrow 20, that is in longitudinal direction of the recording element 10. Simultaneously the pointer 18 of the measuring instrument (not shown) carries out swinging motions substantially transversally to the recording element 10 and the metal coating 11. Furthermore, a potential difference ranging preferably between 2 and 14 volts is imparted by the current source 17 to the needle 16 of the pointer 18 and the metal coating 11, the needle 16 being preferably connected to the negative terminal of the current source 17 and the metal coating 11 over the roller 21 to the positive terminal of the current source 17. Preferably the recording speed used for making micro recordings should be in the range between 0.0 and 3.0 meters per second, the recording speed being the vector sum of the speed of the insulating strip 12 and the speed which causes the deflection of the needle 18. In order to make micro recordings which may be easily interpreted, it has been found that the needle 16, or stylus should be 0.01 to 0.08 millimeter wide. With the above set forth parameters, namely, a stylus having a width of 0.01 to 0.08 millimeter, a recording speed of between 0.0 to 3.0 meters per second and a voltage source of preferably 2 to 14 volts connected as described above, a trace will be made by the needle or stylus 16 as a result of the discharge of electric current between the needle 16 and the metal coating 11. The thickness and height of a typical trace produced in accordance with the invention is shown in Fig. 1.

Figure 1:
Fig. 1 is a micro recording made in accordance with the present invention graphically showing an electrical signal oscillating at 30 cycles/second and having an amplitude of 15 mm., drawn to scale.
Figure 2:
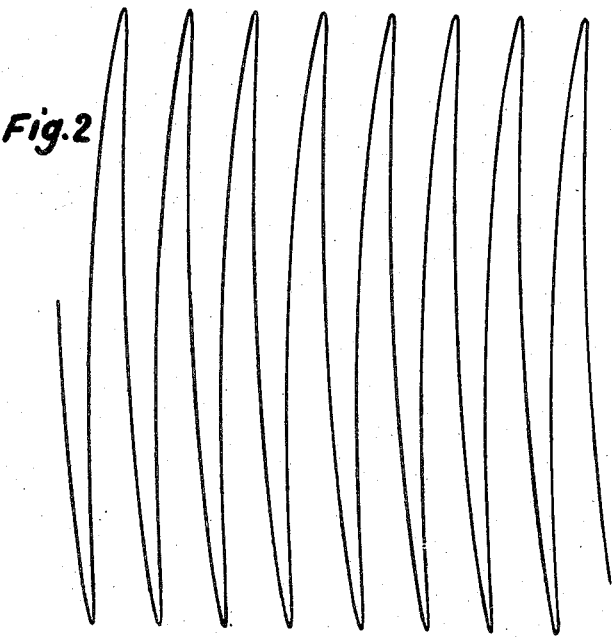
Fig. 2 shows the micro recording of Fig. 1 enlarged eightfold.

As will be noted from Fig. 1 an extremely fine trace is made which is free of slag, beads of molten metal, and other irregularities. The trace shown in Fig. 1 is approximately 0.02 millimeter thick. Even by enlarging the trace to eight times its size as shown in Fig. 2, which would mean, in the present case, enlarging the trace of Fig. 1 to the dimension of a trace made on a standard record carrier of 140 mm., a very accurate reading is still be obtained.

As a rule a permanent enlargement of the recording is not necessary. It is generally the practice to visually observe micro recordings directly by means of a light shining through the traces made in the metal coating. It is apparent of course that with such an arrangement the record carrier must be transparent at that portion thereof where a trace is to be burned by the needle or stylus in the metal coating.

One outstanding advantage of making micro recordings as against making recordings in their usual size, lies in the fact that only one fiftieth part of the recording paper is required in comparison to that necessary for making recordings of customary size.

Fig. 3 illustrates a recording made with a 0.2 millimeter thick stylus on a 140 millimeter wide record carrier strip, the recorded trace being drawn to scale. It is to be especially noted that the trace, produced by a stylus which is 0.2 millimeter thick, is heavier than the trace shown in Fig. 2 which is an eightfold enlargement of the micro recording shown in Fig. 1, the micro-recording of Fig. 1 being made with an electrical recording system in accordance with the present invention.

As already mentioned it is not necessary to permanently increase the micro recording of Fig. 1 to the size shown in Fig. 2 for an accurate valuation of the recorded trace. In most cases micro recordings are interpreted, when necessary, with the aid of optical means, such as for instance, a magnifying lens, or if desired by projecting a light emanating from a light source through the burned trace, that is, if the insulating strip 12 is transparent at that portion thereof where the trace is made, so that an enlarged image falls on a screen, such as for example, a ground glass plate screen. It is also of advantage if a measuring scale is provided on the record carrier, the measuring scale having markings of a thickness similar to the thickness of the measured traces thus enabling rapid interpretation and evaluation of the recorded signals.

In summary, the advantages obtained by making micro recordings as compared to the making of the customary size recordings by means of known apparatus, do not alone involve saving of recording carrier material, nor merely the fact that much more information can be obtained at a glance of the recorded data due to the greater amount of information recorded within a given time span, but also in that the apparatus used for making micro recordings is intrinsically smaller and also partly because the necessary equipment may be constructed more simply than the customary apparatus used for making usual sized recordings, such as that shown in Fig. 3.

It will be understood that each of the elements described above, or two or more together, may also find a useful application in other types of recording systems differing from the types described above.

While the invention has been illustrated and described as embodied in micro recording systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an arrangement for making micro recordings, in combination, a sheet of insulating material; a metal coating on one side of said sheet of insulating material; a layer of liquid of relatively low volatility on said metal coating; a stylus of approximately 0.08 millimeter thickness engaging said metal coating; and a voltage source of approximately 12 volts connected between said metal coating and said stylus.

2. An arrangement for making micro recordings, comprising, in combination, a sheet of insulating material; a metal coating on one side of said sheet of insulating material; a layer of liquid of relatively low volatility on said metal coating; a stylus of approximately 0.08 millimeter thickness engaging said metal coating; a voltage source of approximately 12 volts connected between said metal coating and said stylus; and moving means for moving said sheet of insulating material and said stylus with respect to each other at a rate of approximately 0.3 meter per second.

3. An arrangement for making micro recordings, comprising, in combination, a sheet of partially transparent insulating material; a metal coating on one side of said sheet of partially transparent insulating material; a layer of liquid of relatively low volatility on said metal coating; a stylus of approximately 0.08 millimeter thickness engaging said metal coating; moving means for moving said sheet of partially transparent insulating material and said stylus with respect to each other at a rate of approximately 0.3 meter per second; and a voltage source of approximately 12 volts connected between said metal coating and said stylus for burning a trace in said metal coating over the partially transparent portion of the sheet of insulating material.

4. An arrangement for making micro recordings, comprising, in combination, a sheet of partially transparent insulating material having scale markings thereon; a metal coating on one side of said sheet of partially transparent insulating material; a layer of liquid of relatively low volatility on said metal coating; a stylus of approximately 0.08 millimeter thickness engaging said metal coating; moving means for moving said sheet of partially transparent insulating material and said stylus with respect to each other at a rate of approximately 0.3 meter per second; and a voltage source of approximately 12 volts connected between said metal coating and said stylus for burning a trace in said metal coating over the partially transparent portion of the sheet of insulating material thereby permitting light to pass through the burned trace in said metal coating.

5. An arrangement for making micro recordings, comprising, in combination, a sheet of insulating material; a metal coating on one side of said sheet of insulating material; a layer of liquid of relatively low volatility on said metal coating; a stylus of 0.01 to 0.08 millimeter thickness engaging said metal coating; a voltage source of approximately 2 to 14 volts connected between said metal coating and said stylus; and moving means for moving said sheet of insulating material and said stylus with respect to each other at a rate less than 3.01 meters per second.

6. An arrangement for making micro recordings, comprising, in combination, a sheet of partially transparent insulating material having scale markings along an edge portion thereof; a metal coating on one side of said sheet of partially transparent insulating material; a layer of oil on said metal coating; a stylus of 0.01 to 0.08 millimeter thickness engaging said metal coating; moving means for moving said sheet of partially transparent insulating material and said stylus with respect to each other at a rate less than 3.01 meters per second; and a voltage source of approximately 2 to 14 volts connected between said metal coating and said stylus for burning a trace in said metal coating over the partially transparent portion of the sheet of insulating material thereby permitting light to pass through the burned trace in said metal coating.

7. An arrangement for making micro recordings, comprising, in combination, a sheet of partially transparent insulating material having scale markings along an edge portion thereof; a metal coating on one side of said sheet of partially transparent insulating material; a layer of liquid of relatively low volatility on said metal coating; a stylus of 0.01 to 0.08 millimeter thickness engaging said metal coating; moving means for moving said sheet of partially transparent insulating material and said stylus with respect to each other at a rate less than 3.01 meters per second; and a voltage source of approximately 2 to 14 volts connected between said metal coating and said stylus for burning a trace in said metal coating over the partially transparent portion of the sheet of insulating material thereby permitting light to pass through the burned trace in said metal coating.

8. A process of making micro recordings on an electrical insulating material having a metal coating and having thereon a coating being in liquid state and of low volatility and adapted to vaporize upon heating to a predetermined temperature, said process comprising the steps of moving the coated insulating material at a speed adapted for micro recording; and applying to said coatings localized heat of at least said predetermined temperature so as to volatilize said liquid coating and to burn a trace through said metal coating where said localized heat is applied.

9. A process of making micro recordings on an electrical insulating material having a metal coating and having thereon a coating being in liquid state and of low volatility and adapted to vaporize upon heating to a predetermined temperature, said process comprising the steps of moving the coated insulating material at a speed in the range between 0.3 and 3.01 meters per second; and applying to said coatings localized heat of at least said predetermined temperature so as to volatilize said liquid coating and to burn a trace through said metal coating where said localized heat is applied.

References Cited in the file of this patent

UNITED STATES PATENTS

| | | |
|---|---|---|
| 676,106 | Valiquet | June 11, 1901 |
| 912,181 | Schattner | Feb. 9, 1909 |
| 1,825,551 | Serrell | Sept. 29, 1931 |
| 2,000,527 | Linderman | May 7, 1935 |
| 2,294,149 | Kline et al. | Aug. 25, 1942 |
| 2,372,170 | Baker | Mar. 27, 1945 |
| 2,619,401 | Greig | Nov. 25, 1952 |
| 2,664,044 | Dalton | Dec. 29, 1953 |

FOREIGN PATENTS

| | | |
|---|---|---|
| 780,132 | France | Apr. 19, 1935 |